(12) United States Patent
Mayo

(10) Patent No.: US 7,210,830 B1
(45) Date of Patent: May 1, 2007

(54) ILLUMINATED LICENSE PLATE AND/OR LICENSE PLATE COVER AND/OR FRAME

(76) Inventor: Gary Mayo, 10224 Malvern Ct., Manassas, VA (US) 20110-6087

( * ) Notice: Subject to any disclaimer, the term of this patent is extended or adjusted under 35 U.S.C. 154(b) by 0 days.

(21) Appl. No.: 11/279,129

(22) Filed: Apr. 10, 2006

(51) Int. Cl.
*F21W 101/02* (2006.01)

(52) U.S. Cl. .................. 362/497; 362/498; 362/499

(58) Field of Classification Search .............. 362/497, 362/498, 499
See application file for complete search history.

(56) References Cited

U.S. PATENT DOCUMENTS 6,027,235 A * 2/2000 Chen ...................... 362/497
6,404,334 B1 * 6/2002 Chao ...................... 340/472
6,478,458 B2 * 11/2002 Hickman ................. 362/473
6,526,680 B1 * 3/2003 Yu .......................... 40/204
6,874,922 B2 * 4/2005 Matsuura et al. ......... 362/497

* cited by examiner

*Primary Examiner*—Laura K. Tso
(74) *Attorney, Agent, or Firm*—Justin Lampel

(57) ABSTRACT

The present invention generally relates to an illuminated license plate and/or a license plate cover and/or frame. More specifically, the invention includes an illuminated license plate and or license plate cover or frame which may be used to indicate the breaking or turning of a vehicle. Further, the invention may be used for vanity purposes and/or safety purposes. The invention is particularly useful for law enforcement agencies. The license plate may be constructed with the illuminating devices already inserted or the license plate and/or license plate cover or frame may be altered to allow the insertion of the illuminating devices.

7 Claims, 2 Drawing Sheets

ILLUMINATED LICENSE PLATE AND/OR LICENSE PLATE COVER AND/OR FRAME

The present invention generally relates to an illuminated license plate and/or a license plate cover and/or frame. More specifically, the invention includes an illuminated license plate and/or license plate cover or frame which may be used to indicate the breaking or turning of a vehicle. Further, the invention may be used for vanity purposes and/or safety purposes. The invention is particularly useful for law enforcement agencies. The license plate may be constructed with the illuminating devices already inserted or the license plate and/or license plate cover or frame may be altered to allow the insertion of the illuminating devices.

It is known to provide license plates to vehicles. Moreover, license plates are required on most vehicles traveling on public roads in the United States. License plates allow authorities to track vehicles for a number of reasons including, public safety, civil planning and law enforcement. It is also known for vehicles to have tail and/or brake lights to indicate the movement of the vehicle. Still further, it is known to provide an illuminating device, such as a light bulb, to illuminate the license plate of a vehicle. Illuminating the license plate of a vehicle allows the license plate to be more easily visible, especially at night.

However, many known illuminating devices are ineffective at properly illuminating the license plate. Further, known illuminating devices are ineffective at providing proper safety for the vehicle and/or others utilizing the roadways. Finally, known illuminating devices do not allow the owner of a vehicle to display their license plate in the most effective manner. There is no known illuminating device located within the actual license plate and/or license plate cover or frame which illuminates the license plate and/or cover or frame.

A need, therefore, exists for an illuminated license plate and/or a license plate cover and/or frame which overcomes the deficiencies of the previous illuminating devices. More specifically, a need exists for an illuminated license plate and/or a license plate cover and/or frame which allows for an effective illumination of the license plate.

SUMMARY OF THE INVENTION

The present invention generally relates to an illuminated license plate and/or a license plate cover and/or frame. More specifically, the invention includes an illuminated license plate and or license plate cover or frame which may be used to indicate the breaking or turning of a vehicle. Further, the invention may be used for vanity purposes and/or safety purposes. The invention is particularly useful for law enforcement agencies. The license plate may be constructed with the illuminating devices already inserted or the license plate and/or license plate cover or frame may be altered to allow the insertion of the illuminating devices.

It is, therefore, an advantage of the present invention to provide an illuminated license plate and/or license plate cover or frame.

A further advantage of the present invention is to provide an illuminated license plate and/or license palate cover or frame which indicates the movement of the vehicle.

A still further advantage of the present invention is to provide an illuminated license plate and/or license plate cover or frame which is easily visible.

A further advantage of the present invention is to provide an illuminated license plate and/or license plate cover or frame which aids law enforcement in the identification of the owner of a vehicle.

Yet another advantage of the present invention is to provide an illuminated license plate and/or license plate cover or frame which is brighter than previous illuminated license plates.

And another advantage of the present invention is to provide an illuminated license plate and/or license plate cover or frame which is illuminated with neon.

Still another advantage of the present invention is to provide a method of converting a normal license plate and/or frame or cover into an illuminated license plate and/or license plate cover or frame.

And another advantage of the present invention is to provide an illuminated license plate and/or license plate cover or frame which is easily visible in fog, rain or other diminished visibility conditions.

For a more complete understanding of the above listed features and advantages of the illuminated license plate and/or license plate cover or frame, reference should be made to the following detailed description of the preferred embodiments and to the accompanying drawings. Further, additional features and advantages of the present invention are described in, and will be apparent from, the detailed description of the preferred embodiments and from the drawings.

DETAILED DESCRIPTION OF THE PREFERRED EMBODIMENTS

The present invention generally relates to an illuminated license plate and/or a license plate cover and/or frame. More specifically, the invention includes an illuminated license plate and or license plate cover or frame which may be used to indicate the breaking or turning of a vehicle. Further, the invention may be used for vanity purposes and/or safety purposes. The invention is particularly useful for law enforcement agencies. The license plate may be constructed with the illuminating devices already inserted or the license plate and/or license plate cover or frame may be altered to allow the insertion of the illuminating devices.

Figure 1:
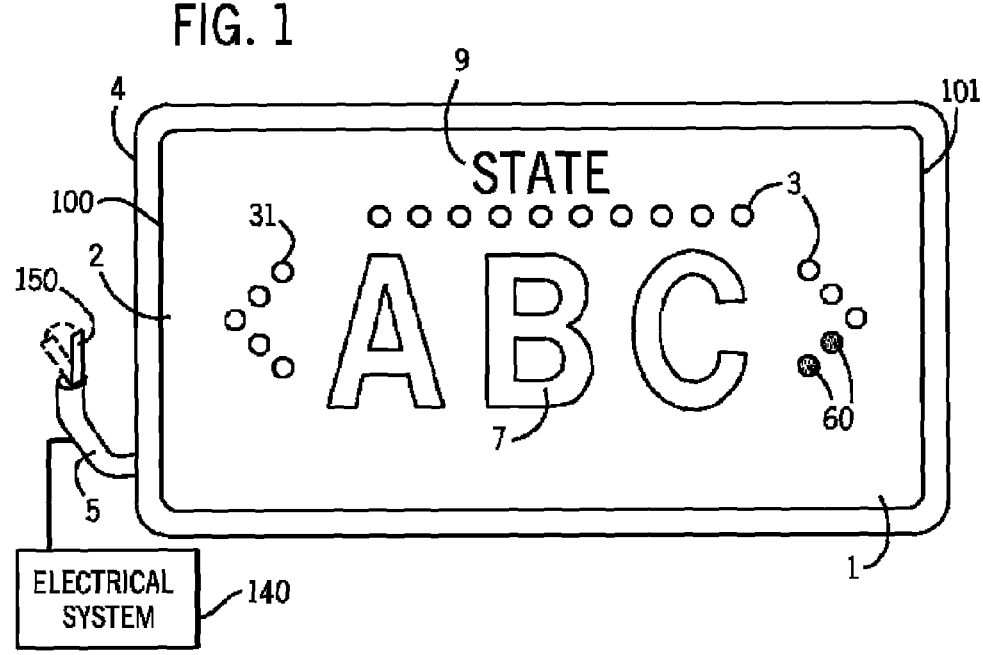
FIG. 1 illustrates a front plan view of the license plate of the present invention wherein an illuminating device is located within the license plate.

Referring now to the drawings wherein like numerals refer to like parts, FIG. 1 illustrates a license plate 1 having an illuminating device 3. The license plate 1 may have a front side 2, a back side 4, a first side 100 and a second side 101. The illuminating device 3 may be a standard light bulb, a neon light or any other source of light. The illuminating device 3 may be a series of light sources (as Illustrated in FIG. 1) located, for example, on the front side 2 of the license plate 1. The illuminating device 3 may be electrically connected to, for example, a cord 5 which may be attached to an electrical system 140 of the vehicle and/or a power source (not shown).

The electrical system 140 of the vehicle may control which illuminating devices 3 are to be illuminated at any given time. Further, the electrical system 140 may automatically activate the illuminating devices 3 (such as when breaking) or a person may manually activate the electrical system 140 to illuminate the illuminating device 3 with an activation switch 150 when, for example, turning. More specifically, when a person wishes to make, for example, a left turn, the person may turn the corresponding switch 150 which, as a result, illuminates the appropriate illuminating devices 3.

The illuminating device 3 may, for example, indicate when the vehicle is turning and/or breaking. Further, the illuminating device 3 may, for example, be located to the side(s), top and/or bottom of indicia 7 located on the license plate 1. More specifically, the license plate 1 may have indicia 7 such as, for example, numbers and/or letters, which may identify the vehicle as a registered vehicle with, for example, the Department of Motor Vehicles of a State or other agency.

The license plate 1 may be manufactured with the illuminating device 3 already inserted or the license plate 1 may be modified by the insertion of the illuminating device 3. More specifically, if a license plate 1 is constructed without the illuminating device 3, as is currently done in all known states, a person my cut out an opening 60 within the license plate 1 for the insertion of the illuminating device(s) 3.

The license plate 1 may further have the designation of the State 9 for which the vehicle is registered with. The illuminating device 3 may be located, for example, above or below the designation of the State 9. FIG. 1 illustrates the illuminating device 3 located below the designation of the State 9.

Figure 2:
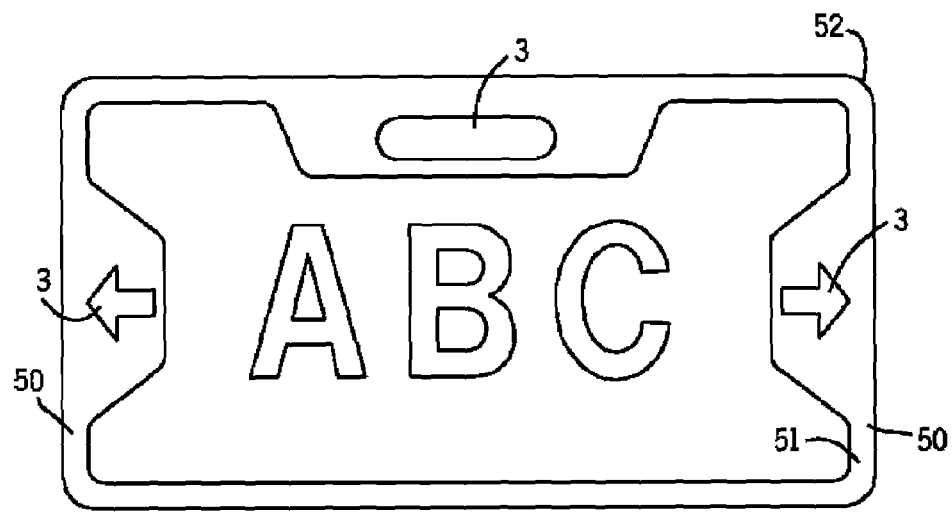
FIG. 2 illustrates a front plan view of the license plate cover of the present invention wherein the license plate cover has an illuminating device.

Referring now to FIG. 2, the license plate 1 may be surrounded by a license plate cover 50. License plate covers 50 are generally known to protect the license plate 1 and/or are used for ornamental purposes. The license plate cover 50 may be placed over the perimeter of the license plate 1 or the license plate cover 50 may be placed over the entire license plate 1. License plate covers 50 which are placed over the entire license plate 1 typically have a transparent portion 70 (FIG. 3) which allows a person to view indicia 7 on the license plate 1. The transparent portion 70 of the license plate cover 50 may have a front side 71 and a back side 72. The illuminating device 3 may be located adjacent to the back side 72 of the transparent portion 70 of the license plate cover 50. Accordingly, the illuminating device 3 and/or the indicia 7 may be visible through the transparent portion 70 of the license plate cover 50.

The illuminating device may be a series of, for example, light bulbs 31. The light bulbs 31 may illuminate simultaneously or may illuminate at altering times. For example, the illuminating devices 3 located on the first side 100 of the license plate 1 may be illuminated if the driver is making a left hand turn. Further, the illuminating device 3 located on the second side 101 of the license plate 1 may be illuminated if the driver is making a right hand turn. If there is a license plate 1 on the front and rear of the vehicle, the first side 100 of the front of the license plate 1 may illuminate at the same time as the second side 101 of a rear license plate 1 and vice versa.

The license plate cover 50 may have a front side 51 and a back side 52. The illuminating device 3 may be located on, for example, the front side 51 of the license plate cover 50. More specifically, the illuminating device 3 may be located on the front side 51 of the license plate cover 50 so as to allow a person to view the illuminating device 3.

Figure 3:
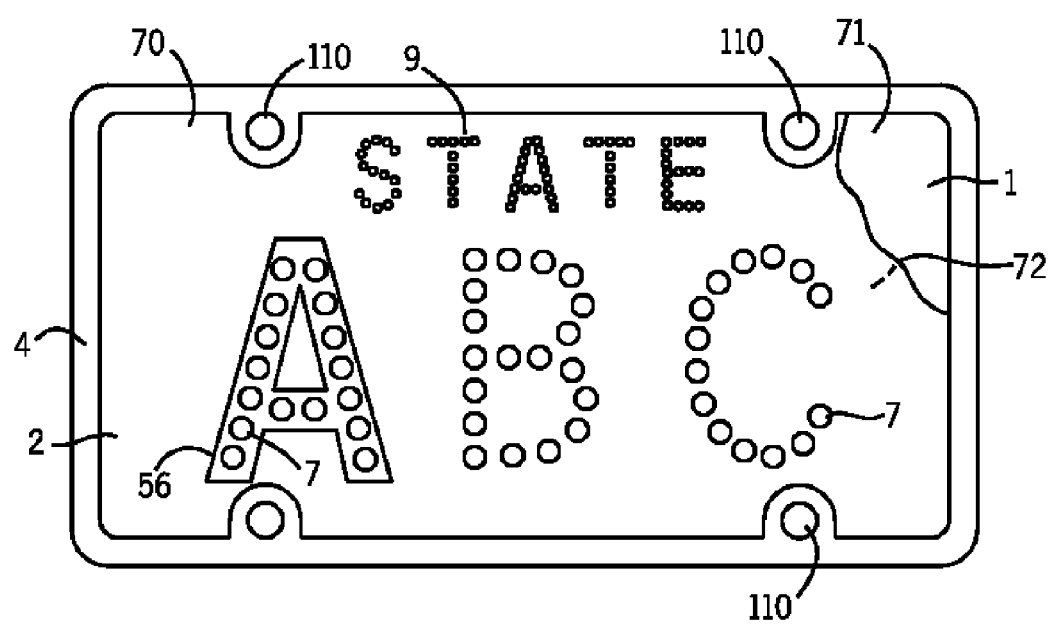
FIG. 3 illustrates a front plan view of the license plate of the present invention wherein the indicia of the license plate is illuminated.

Referring now to FIG. 3, the license plate 1 of the present invention is provided wherein the indicia 7 of the license plate 1 is illuminated. More specifically, the illuminated device 3 may be located within an outline border 56 of the indicia 7 or the illuminating device 3 may be placed in a pattern so as to provide indicia 7. FIG. 3 illustrates the letter "A" having an outline border 56 and the illuminating device 3 of letters "B" and "C" placed in a pattern so as to provide indicia 7.

The license plate cover 50 may have a plurality of openings 110 which may allow, for example, a securing device, such as a screw, to secure the license plate 1 and/or the license plate cover 50 to the vehicle. Typically, the vehicle has matching openings for receiving the securing device (not shown).

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A License plate comprising:
   a front surface having a perimeter;
   indicia located on the front surface wherein the indicia is a state issued license plate number;
   a back surface; and
   an illuminating device located within the perimeter of the front surface.

2. The license plate of claim 1 wherein the indicia is illuminated.

3. The license plate of claim 1 wherein the illumination device indicates the intended direction of travel of a vehicle.

4. The license plate of claim 1 wherein the illuminating device indicates that a vehicle is changing speeds.

5. A license plate cover comprising:
   a front surface having a perimeter;
   a back surface;
   an illuminating device located on the front surface wherein the illuminating device provides information to another and wherein the information is a state issued license plate number.

6. The license plate cover of claim 5 wherein the information provided to another relates to a change in speed of a vehicle.

7. The license plate cover of claim 5 wherein the information provided to another relates to the intended direction of travel of a vehicle.

* * * * *